United States Patent
Lin

(10) Patent No.: US 8,409,054 B2
(45) Date of Patent: Apr. 2, 2013

(54) VEHICLE OVERSPEED SYSTEM IMPLEMENTING IMPELLER CLUTCH LOCKOUT

(75) Inventor: Hong-Chin Lin, Glenview, IL (US)

(73) Assignee: Caterpillar Inc., Peoria, IL (US)

( * ) Notice: Subject to any disclaimer, the term of this patent is extended or adjusted under 35 U.S.C. 154(b) by 35 days.

(21) Appl. No.: 13/192,628

(22) Filed: Jul. 28, 2011

(65) Prior Publication Data

US 2011/0287891 A1 Nov. 24, 2011

Related U.S. Application Data

(62) Division of application No. 11/730,384, filed on Mar. 30, 2007, now Pat. No. 8,012,061.

(51) Int. Cl.
 *B60W 10/02* (2006.01)
(52) U.S. Cl. .......................................... 477/84; 477/175
(58) Field of Classification Search .................. 477/84, 477/174, 175
See application file for complete search history.

(56) References Cited

U.S. PATENT DOCUMENTS

| | | |
|---|---|---|
| 3,789,698 A | 2/1974 | Williams |
| 3,805,640 A | 4/1974 | Schneider et al. |
| 4,027,554 A | 6/1977 | Ito et al. |
| 4,126,061 A | 11/1978 | Fry |
| 4,338,832 A | 7/1982 | Pelligrino |
| 4,373,619 A | 2/1983 | Schritt et al. |
| 4,463,842 A | 8/1984 | Redzinski |
| 4,468,987 A | 9/1984 | Miller |
| 4,526,255 A | 7/1985 | Hennessey et al. |
| 4,961,484 A | 10/1990 | Kato et al. |
| 5,040,648 A * | 8/1991 | Mitchell et al. .................. 477/65 |
| 5,182,713 A | 1/1993 | Kitoh |
| 5,587,905 A | 12/1996 | Yesel et al. |
| 5,613,581 A | 3/1997 | Fonkalsrud et al. |
| RE36,186 E | 4/1999 | White et al. |
| 6,277,050 B1 | 8/2001 | Nakagawa et al. |
| 6,537,177 B2 | 3/2003 | Degroot et al. |
| 6,620,077 B2 | 9/2003 | Carlson et al. |
| 7,044,890 B2 | 5/2006 | Kojima et al. |
| 2003/0097892 A1 | 5/2003 | Hedman |

FOREIGN PATENT DOCUMENTS

| | | |
|---|---|---|
| EP | 1 043 487 | 10/2000 |
| EP | 1 253 356 | 10/2002 |
| EP | 1 302 358 | 4/2003 |

OTHER PUBLICATIONS http://www.cat.com/cda/components/fullArticle?m=82580&x=7&id=244816, pp. 1-3. Nov. 13, 2006.
Caterpillar 854G Wheel Dozer Product Brochure, 20 pages, printed Dec. 1999.

* cited by examiner

*Primary Examiner* — David D Le
*Assistant Examiner* — Derek D Knight
(74) *Attorney, Agent, or Firm* — Finnegan, Henderson, Farabow, Garrett & Dunner LLP

(57) ABSTRACT

An overspeed system for a vehicle is disclosed. The overspeed system may have a power source, a transmission unit, and a torque converter assembly operatively coupling the power source to the transmission unit. The overspeed system may also have a travel speed sensor configured to generate a signal indicative of a vehicle speed, and a controller in communication with the torque converter assembly and the travel speed sensor. The controller may be configured to prevent a decoupling of the torque converter assembly in response to the signal.

22 Claims, 5 Drawing Sheets

VEHICLE OVERSPEED SYSTEM IMPLEMENTING IMPELLER CLUTCH LOCKOUT

This is a division of application Ser. No. 11/730,384, filed Mar. 30, 2007 now U.S. Pat. No. 8,012,061, which is fully incorporated herein by reference.

TECHNICAL FIELD

The present disclosure relates generally to a vehicle overspeed system and, more particularly, to a vehicle overspeed system that implements impeller clutch lockout.

BACKGROUND

Machines, including on- and off-highway haul and vocational trucks, wheel loaders, motor graders, and other types of heavy machinery generally include a multi-speed, bidirectional, mechanical transmission drivingly coupled to an engine by way of a torque converter assembly. The torque converter assembly multiplies and/or absorbs torque fluctuations transmitted between the engine and the traction devices of the machine by allowing slippage between an output shaft of the engine and an input shaft of the transmission. To improve fuel consumption and reduce power loss due to the slippage, the torque converter assembly typically includes a lockup clutch for mechanically coupling the engine output and transmission input shafts at high travel speeds. The torque converter assembly may also include an impeller clutch to allow the operator to have another degree of freedom in determining the slippage between the output shaft of the engine and the input shaft of the transmission. The impeller clutch allows for high engine speeds while limiting the torque that is transmitted through the transmission, thus allowing some of the torque to be directed for other purposes.

During operation of the machine, the traction devices can be decoupled from the engine to allow the machine to coast down an incline and accelerate quickly without driving the engine and incurring associated power losses. This decoupling can be accomplished by selecting a neutral condition of the transmission, decreasing the degree of engagement of the impeller clutch, or releasing the lockup clutch. However, in some situations, decoupling the traction devices from the engine when traveling too fast can cause the machine to accelerate to a speed that exceeds a braking capacity of the machine. In these situations, excessive brake wear and damage to the machine may be possible.

One method of preventing coasting to an excessive speed is disclosed in U.S. Pat. No. 4,373,619 (the '619 patent) issued to Schritt et al. on Feb. 15, 1983. The '619 patent discloses a control system for a shiftable multi-speed hydraulically operated transmission system. The transmission system includes internal clutches, which are selectively operated to effect shifting in neutral, reverse, or forward speed ranges. The transmission system also includes a manually operable multi-position speed range selector switch, sensing devices for ascertaining transmission input and output speeds, and other condition responsive switches. The transmission system also includes logic circuits therein for receiving input signal information from the switches and sensing devices, and for providing output signals to effect automatic shifting of the transmission to a selected speed range.

The transmission system of the '619 patent provides operational safeguards. Specifically, in response to an operator input selecting a desired shift to neutral, the transmission system compares a vehicle speed to a non-attainment threshold. If the vehicle speed exceeds the non-attainment threshold, the desired shift to neutral is inhibited. As the vehicle speed reduces to below the non-attainment threshold, the desired shift to neutral is accommodated. In this manner, a decoupling of traction devices from the engine that could result in overspeed of the vehicle may be prevented.

Although the transmission system of the '619 patent may minimize the likelihood of overspeed due to coasting, it may still be possible for an operator to inappropriately decouple the traction devices from the engine. Specifically, the operator may still be able to depress an impeller clutch input device causing the lockup clutch to disengage and/or decrease the degree of engagement of the impeller clutch. A decrease in the engagement of the impeller clutch results in less torque being conducted between the engine and traction devices, thereby allowing the vehicle to coast more freely. In addition, it may also still be possible for the lockup clutch to disengage, again allowing the vehicle to coast more freely. As described above, this increased ability to coast can result in the vehicle overspeeding.

SUMMARY OF THE INVENTION

In one aspect, the present disclosure is directed to a vehicle overspeed system. The vehicle overspeed system may include a power source, a transmission unit, and a torque converter assembly. The torque converter assembly may operatively couple the power source to the transmission unit. The vehicle overspeed system may also include a sensor configured to generate a signal indicative of a vehicle speed, and a controller in communication with the torque converter assembly and the sensor. The controller may be configured to prevent a decoupling of the torque converter assembly in response to the signal.

In yet another aspect, the present disclosure is directed to a method of preventing vehicle overspeeding. The method may include transmitting power from a traction device of a vehicle to a power source of the vehicle. The method may further include sensing a speed of the vehicle, and selectively preventing interruption of the power transmission based on the sensed speed.

DETAILED DESCRIPTION

Figure 1:
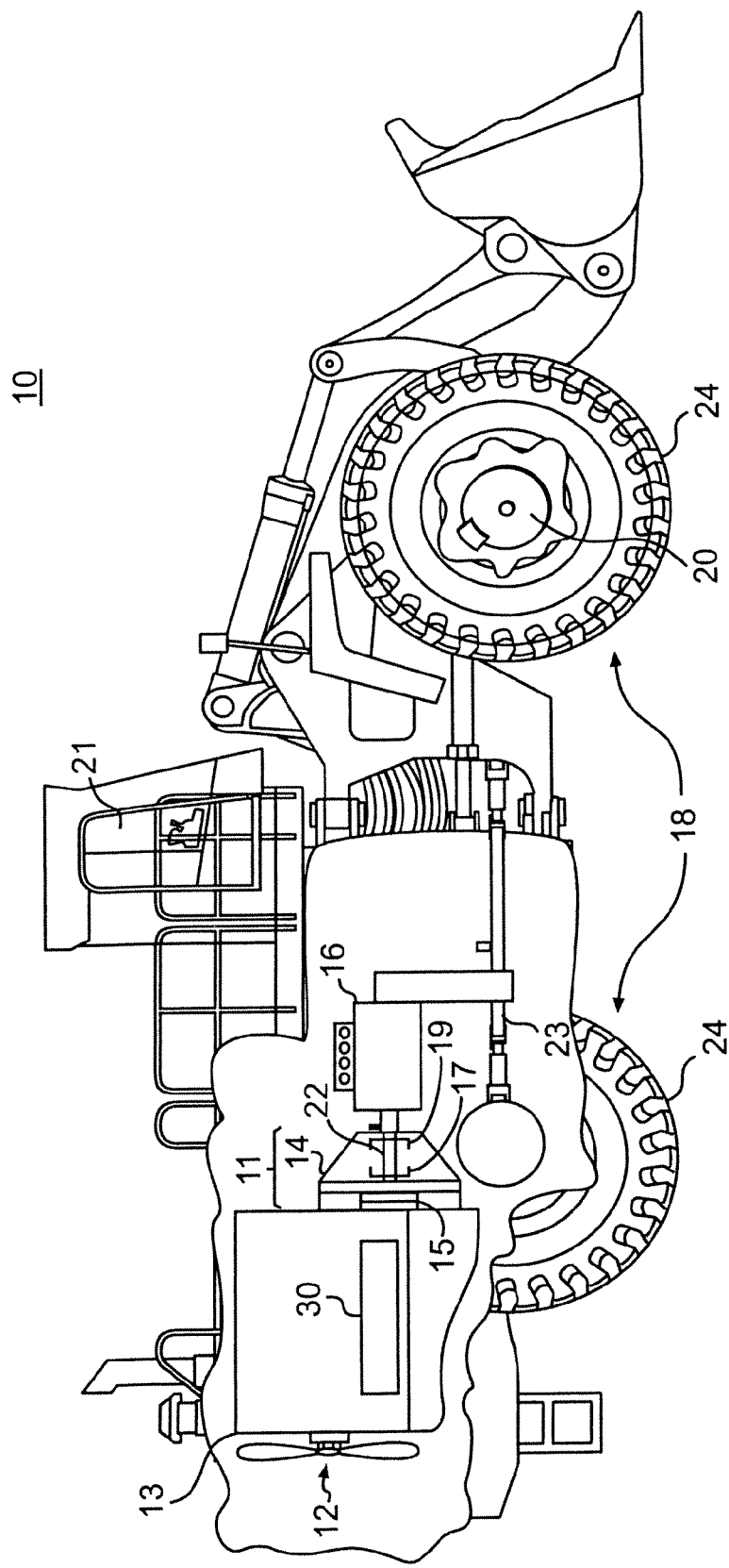
FIG. 1 is a diagrammatic illustration of an exemplary disclosed machine.

FIG. 1 illustrates an exemplary machine 10. Machine 10 may embody a mobile machine that performs some type of operation associated with an industry such as mining, construction, farming, transportation, or any other industry known in the art. For example, machine 10 may be an earth moving machine such as a wheel loader, an off-highway haul truck, a motor grader, or any other suitable earth moving machine. Machine 10 may alternatively embody an on-highway vocational truck, a passenger vehicle, or any other operation-performing machine. Machine 10 may include, among other things, a power source 12, a torque converter assembly 14, a transmission 16 operably connected to a traction device 18, a brake mechanism 20, and an operator station 21.

Power source 12 may produce a power output and may embody an internal combustion engine. For example, power source 12 may embody a diesel engine, a gasoline engine, a gaseous fuel-powered engine, or any other engine apparent to one skilled in the art. Power source 12 may contain an engine block 13 having a plurality of cylinders (not shown), reciprocating pistons disposed within the cylinders (not shown), and a crankshaft operatively connected to the pistons (not shown).

Engine block 13 may be a central structural member defining the plurality of cylinders. Each piston may be configured to reciprocate between a bottom-dead-center (BDC) position, or lower-most position within the cylinder, and a top-dead-center (TDC) position, or upper-most position within the cylinder. The piston may be pivotably connected via a mechanical linkage with the crankshaft. The crankshaft of power source 12 may be rotatably disposed within engine block 13 and each piston coupled to the crankshaft so that a translational motion of each piston within each cylinder results in a rotation of the crankshaft. Similarly, a rotation of the crankshaft may result in a sliding motion of the pistons. As the crankshaft rotates 180 degrees the piston may move through one full stroke between BDC and TDC.

The internal combustion engine may use a combustion cycle to convert potential energy (usually in chemical form) to useful work output. For example, internal combustion engine may be a four stroke engine, wherein a complete combustion cycle includes an intake stroke (TDC to BDC), where a combustible fuel is introduced into the cylinder, a compression stroke (BDC to TDC), where the combustible fuel is compressed, a power stroke (TDC to BDC), where the combustible fuel is combusted, and an exhaust stroke (BDC to TDC), where the resultant exhaust gasses are expelled. It is also contemplated that internal combustion engine may alternatively be a two stroke engine, wherein a complete cycle includes a compression/exhaust stroke (BDC to TDC) and a power/exhaust/intake stroke (TDC to BDC). The combustion cycle may drive rotation in the crankshaft, which may in turn rotate the input of torque converter assembly 11.

The reciprocating cycle of the pistons may also act to decelerate power source 12 and subsequently machine 10. This deceleration may occur when the energy consumed by the frictional, compression, and inertial losses of the moving pistons and other moving components of power source 12 are greater than the resultant energy. The frictional, compression, and inertial losses may be increased through the use of an engine retarder 30.

Engine retarder 30 may embody any device that selectively increases the natural resistance of power source 12 to motion. For example, engine retarder 30 may embody an engine brake or an exhaust brake. An engine brake may function to open exhaust valves (not shown) of power source 12 near a top dead center position of the piston's compression stroke. By opening the exhaust valves near top dead center of the compression stroke, highly-compressed air may be vented to the atmosphere, thereby removing stored energy from the associated pistons of power source 12. On the ensuing downward power stroke, essentially no energy is returned to the piston (and to traction device 18 via transmission 16), resulting in a deceleration of machine 10. In contrast, an exhaust brake may include a butterfly-type valve disposed within an exhaust manifold of power source 12 to restrict the exiting flow of exhaust gases. The restricted flow of exhaust gases may cause a backup of pressure within power source 12 that increases the work that the pistons of power source 12 must perform during the compression and exhaust strokes of power source 12, resulting in a deceleration of machine 10. It is contemplated that engine retarder 30 may alternatively be located immediately upstream of torque conversion system 11 (referring to the flow of power during normal operation of machine 10) to directly remove power from the input of transmission 16 (e.g., transmission braking).

Torque converter assembly 11 may be used to transmit torque from power source 12 to transmission 16. Torque converter assembly 11 may include a torque converter 14, a lockup clutch 22, and an impeller clutch 15.

Torque converter 14 may be a hydro-mechanical device configured to transmit torque from power source 12 to transmission 16. Torque converter 14 may allow power source 12 to rotate somewhat independently of transmission 16. For example, torque converter 14 may contain an impeller 17 and a turbine 19. Impeller 17 may be connected to the output of impeller clutch 15. It is also contemplated that impeller 17 may be directly connected to power source 12, and impeller clutch 15 may be located on the output side of torque converter 14. For example, the first clutch of transmission 16 (not shown) may be used as impeller clutch 15.

Impeller 17 may rotate as a result of power source actuation (dependent on the degree of impeller clutch engagement). This rotation of impeller 17 may thus impart a momentum to fluid within torque converter. Turbine 19 connected to transmission 16 may receive this momentum, thus causing turbine 19 and subsequently transmission 16 to rotate. At low fluid flow rates and pressures, impeller 17 may rotate at a higher speed relative to turbine 19. However, as the pressure and the flow rate of the fluid conducted between impeller 17 and turbine 19 increase, turbine 19 may approach the rotational speed of impeller 17.

Impeller clutch 15 may allow variable engagement between power source 12 and transmission 16. Specifically, impeller clutch 15 may allow power source 12 to rotate at a relatively high speed while allowing transmission 16 to rotate at a lower speed. Impeller clutch 15 may embody a disc-type clutch located between the output of power source 12 and the input of torque converter 14. Impeller clutch 15 may contain an input disk (not shown) and an output disk (not shown). The input disk may be connected to power source 12 and may rotate as a result of power source actuation. The output disk may be oriented coaxially to the input disk and may be connected to the input of torque converter 14. The input disk and the output disk of impeller clutch 15 may be engaged by a hydraulic and/or mechanical actuator that axially presses the disks together, thus allowing frictional forces to couple the rotation of the input disk to the rotation of the output disk or vice versa. Impeller clutch 15 may reduce the engagement of power source 12 to transmission 16 by decreasing the degree of frictional engagement between the input disk and the output disk, thus allowing the disks to rotate more freely relative to each other. Similarly, impeller clutch 15 may increase the engagement of power source 12 to transmission 16 by increasing the degree of frictional engagement between the input disk and the output disk. It is contemplated that impeller clutch 15 may be activated manually or automatically via a controller, as will be described below. Impeller clutch 15 may also generate a signal indicative of its degree of engagement.

Lockup clutch 22 may allow for direct mechanical coupling of the output of power source 12 to the input of transmission 16. For example, when lockup clutch 22 is engaged, power source 12 may directly drive transmission 16. When lockup clutch 22 is disengaged, the coupling between power source 12 and transmission 16 may depend on the status of impeller clutch 15 and torque converter 14. Lockup clutch 22 may engage and disengage automatically in response to one or more inputs, as will be described in more detail below.

Transmission 16 may include numerous components that interact to transmit power from power source 12 to traction device 18. In particular, transmission 16 may embody a multi-speed, bidirectional, mechanical transmission having a neutral gear ratio, a plurality of forward gear ratios, a plurality of reverse gear ratios, and one or more clutches (not shown). The clutches may be selectively actuated to engage predetermined combinations of gears (not shown) that produce a desired output gear ratio. Transmission 16 may be an automatic-type transmission, wherein shifting is based on a power source speed, a maximum operator selected gear ratio, and a shift map stored within a transmission controller. Alternatively, transmission 16 may be a manual transmission, wherein the operator manually engages the actual gear. The output of transmission 16 may be connected to rotatably drive traction device 18 via a shaft 23, thereby propelling machine 10.

Traction device 18 may include wheels 24 located on each side of machine 10 (only one side shown). Alternately, traction device 18 may include tracks, belts, or other driven traction devices. Traction device 18 may be driven by transmission 16 to rotate in accordance with an output rotation of transmission 16.

Brake mechanism 20 may retard the motion of machine 10 and may be operably connected to each wheel 24 of machine 10. In one embodiment, brake mechanism 20 may be a hydraulic pressure-actuated wheel brake such as, for example, a disk brake or a drum brake. In response to a signal indicating a need for braking, a pressure of fluid supplied to brake mechanism 20 may be increased, to thereby increase a rolling resistance of wheel 24. It is contemplated that brake mechanism 20 may alternatively be pneumatically actuated, mechanically actuated, or actuated in any other manner known in the art.

Figure 2:
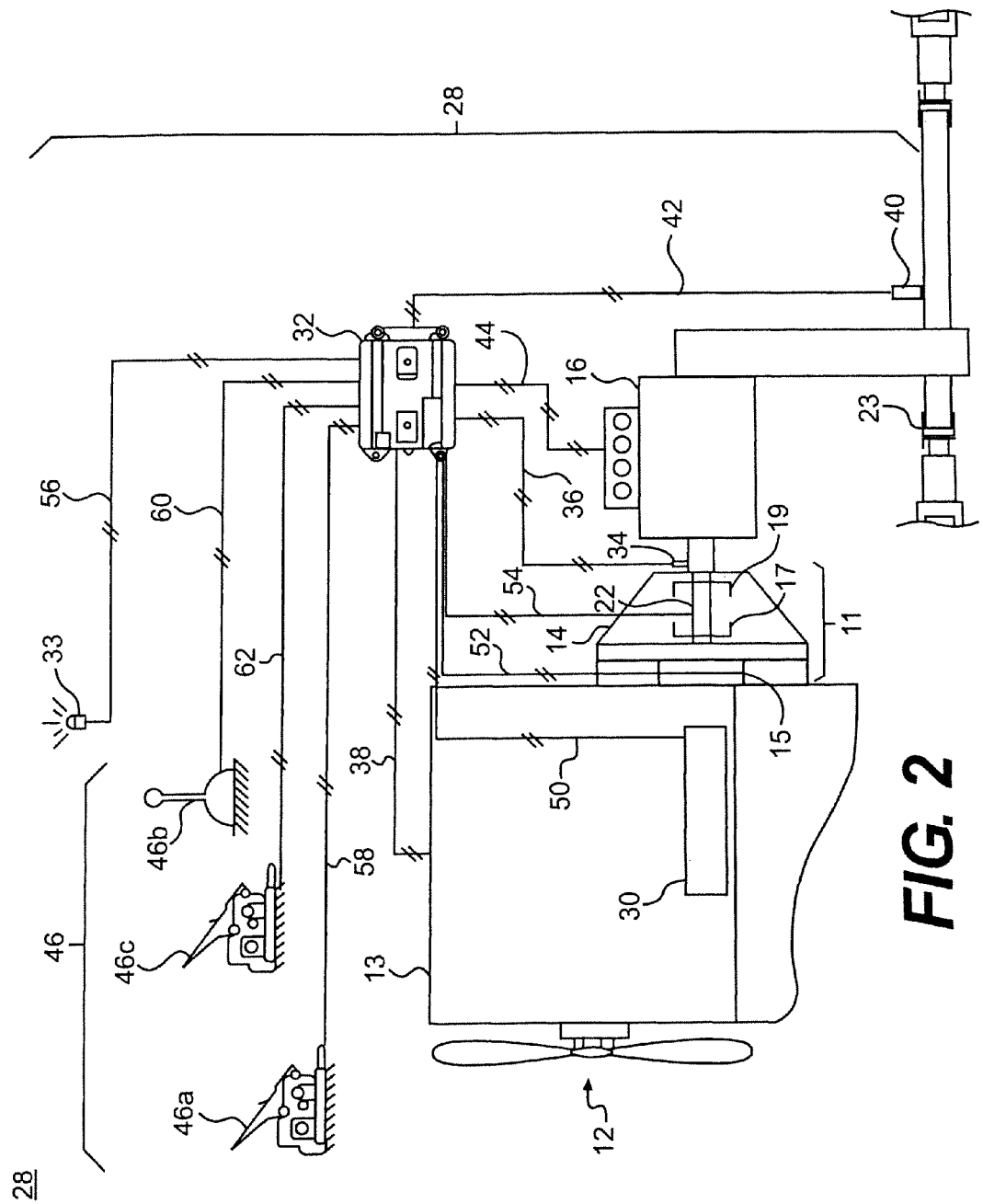
FIG. 2 is a diagrammatic illustration of an exemplary disclosed power train and vehicle control system for the machine of FIG. 1.

Operator station 21, as illustrated in FIG. 2, may include one or more operator interface devices 46 such as a impeller clutch input device 46a, a transmission control device 46b, and a throttle pedal 46c. The operator interface devices 46 may be located proximal an operator seat and embody, for example, single or multi-axis joysticks, wheels, knobs, push-pull devices, pedals, switches, and other operator interface devices known in the art.

Impeller clutch input device 46a may be manually actuated to allow variable control of impeller clutch 15 and brake mechanism 20. The degree of impeller clutch input device 46a actuation may be directly proportional to an amount of coupling between power source 12 and transmission 16 effected by impeller clutch 15. Some portion of the impeller clutch input device travel (e.g., last 50%) may be used to actuate brake mechanism 20. For example, in its unactuated state, impeller clutch input device 46a may signal for impeller clutch 15 to remain fully engaged. As the operator depresses impeller clutch input device 46a, impeller clutch 15 may disengage proportionally until it is fully disengaged at around 50% of the travel of impeller clutch input device 46a. If the operator continues to depress impeller clutch input device 46a through the last 50% of the travel, brake mechanism 20 may engage. It is contemplated that impeller clutch input device 46a may embody a mechanical device, an electrical device, a hydraulic device, or any other type of device known in the art.

Transmission control device 46b may be manually operated to select among the plurality of forward gear ratios, the reverse gear ratio, and the neutral gear ratio. In one embodiment, transmission control device 46b may comprise two related devices (not shown). The operator may use the first device to select the direction of the vehicle (e.g., forward, reverse, and neutral), and the operator may use the second device to select the gear ratio for the given direction (e.g., first gear, second gear, etc. . . . ). When the operator selects a desired gear ratio, the clutches within transmission 16 may engage immediately to effect the desired change. Alternatively, when the operator selects a desired gear ratio, transmission 16 may instead only allow shifting up to the selected gear ratio based on various inputs. Transmission control device 46b may also embody a single device, where the operator selects the direction of machine 10, and the transmission controller determines the needed gear for the selected direction.

Throttle pedal 46c may be manually actuated to increase the rotational speed of power source 12. In particular, a degree of throttle pedal actuation may represent a desired machine travel speed and proportionally control an amount of fuel supplied to power source 12. It is contemplated that throttle pedal 46a may embody a mechanical device, an electrical device, a hydraulic device, or any other type of device known in the art.

As illustrated in FIG. 2, machine 10 may also include a control system 28. Control system 28 may have components that cooperate to prevent vehicle overspeed. In particular, control system 28 may include a controller 32, a torque converter output speed sensor 34, a travel speed sensor 40, and an indicator device 33. Controller 32 may communicate with torque converter output speed sensor 34 via a communication line 36, with power source 12 via a communication line 38, with travel speed sensor 40 via a communication line 42, with transmission 16 via a communication line 44, with engine retarder 30 via a communication line 50, with impeller clutch 15 via a communication line 52, with lockup clutch 22 via a communication line 54, with indicator device 33 via a communication line 56, with impeller clutch input device 46a via a communication line 58, with transmission control device 46b via a communication line 60, and with throttle pedal 46c via a communication line 62.

Controller 32 may embody a single microprocessor or multiple microprocessors that include a means for providing output to control system 28. Numerous commercially available microprocessors may be configured to perform the functions of controller 32. It should be appreciated that controller 32 may readily embody a general machine microprocessor capable of controlling numerous machine functions. Various other circuits may be associated with controller 32, such as power supply circuitry, signal conditioning circuitry, data acquisition circuitry, signal output circuitry, signal amplification circuitry, and other types of circuitry known in the art.

It is also considered that controller 32 may include one or more maps stored within an internal memory of controller 32 and reference these maps to determine a desired output of machine 10. Each of these maps may include a collection of data in the form of tables, graphs, and/or equations. Specifically, the maps may describe a set of conditions that warrant action by controller 32 to prevent vehicle overspeed. Controller 32 may test these conditions by comparing measurement values from travel speed sensor 40, torque converter output speed sensor 34, and the transmission gear sensor (not shown) to predetermined limit values according to a designated algorithm (e.g., controller 32 may test the conditions by determining if the measurement values are greater than or less than the predetermined limit values). The measurement values may include such quantities as, machine travel speed, torque converter output speed, power source speed, and transmission gear ratio. The limit values may include threshold speeds for the impeller clutch output, the machine travel, and power source. The predetermined limit and measurement values may also include position of operator interface devices 46, and rate of change in operator interface devices 46.

If the conditions for vehicle overspeed are satisfied, controller 32 may respond with one or more preprogrammed outputs. For example, controller 32 may communicate with transmission 16 to inhibit the engagement of the neutral gear ratio, inhibit the disengagement of impeller clutch 15, or inhibit disengagement of lockup clutch 22. Controller 32 may enforce one or more of these preprogrammed outputs and override any contrary operator input. The preprogrammed outputs may be independently triggered or triggered in any combination.

For example, to prevent neutral coasting controller 32 may inhibit the engagement of the neutral gear ratio once the speed of machine 10 is above a predetermined neutral threshold speed. This prevention of the neutral gear ratio may cause the rotation of traction device 18 to be coupled to the rotation of power source 12. Thus the rotation of traction device 18, and consequently the travel speed of the vehicle, may be at least somewhat constrained by the losses associated with driving power source 12.

Controller 32 may also prevent the decoupling of torque converter assembly 11 to prevent neutral coasting. This prevention may cause the rotation of traction device 18, and thus the travel speed of machine 10, to be at least somewhat coupled to the rotation of power source 12. Controller 32 may prevent decoupling of torque converter assembly 11 by controlling the degree of engagement of impeller clutch 15 and/or lockup clutch 22. For example, controller 32 may prevent the complete or partial disengagement of impeller clutch 15, if the travel speed of machine 10 is above the predetermined impeller clutch threshold speed. If the travel speed of machine 10 is above the impeller clutch threshold speed, controller 32 may increase the degree of impeller clutch engagement to further increase the constraint imposed on traction device 18 by power source 12. Controller 32 may also prevent the disengagement of lockup clutch 22 to cause the travel speed of machine 10, to be at least somewhat coupled to the rotation of power source 12.

To promote further deceleration of power source 12, controller 32 may activate engine retarder 30 in conjunction with the prevention of impeller clutch disengagement and/or prevention of lockup clutch disengagement. Controller 32 may also reduce the throttle set point of power source 12. Controller 32 may allow lockup clutch 22 and impeller clutch 15 to disengage at a power source threshold speed to avoid damaging power source 12 from excessive rates of power source rotation.

Controller 32 may use any control method such as, bang-bang control, proportional control, proportional integral derivative control, adaptive control, model-based control, logic-based control, and any other control method known in the art. Controller 32 may use either feedforward or feedback control.

Travel speed sensor 40 may be used to determine the travel speed of machine 10 relative to the ground. Travel speed sensor 40 may sense the speed of a rotational component of machine 10, such as an associated wheel 24. For example, speed sensor 40 may be embodied in a magnetic pick up sensor configured to sense a rotational speed of wheel 24 and to produce a signal corresponding to the rotational speed. Speed sensor 40 may be disposed on an axle 40, or a component of wheel 24, or on any other suitable component of machine 10. In this configuration, the rotational speed of the machine component may be related to the machine travel speed. Travel speed sensor 40 may also sense the speed of machine 10 relative to external standards. This may be achieved via a radar or satellite based positioning device, if desired.

Torque converter output speed sensor 34 may be used to determine the rotational output speed of torque converter 14. For example, torque converter output speed sensor 34 may be embodied in a magnetic pick up sensor disposed on the torque converter output shaft. This sensor may be configured to produce a signal corresponding to the rotational speed of the torque converter output shaft. Torque converter output speed sensor 34 may alternatively embody optical encoder sensor or any other sensor type known in the art.

Indicator device 33 may be an apparatus that provides visual feedback to the operator of machine 10. Indicator device 33 may be connected to controller 32 to receive transmissions regarding the status of machine 10 and any of its subcomponents and their related processes and operations. Indicator device 33 may embody, for example, a light, a dial, a display screen, a speaker or any other device known in the art.

Figure 3:
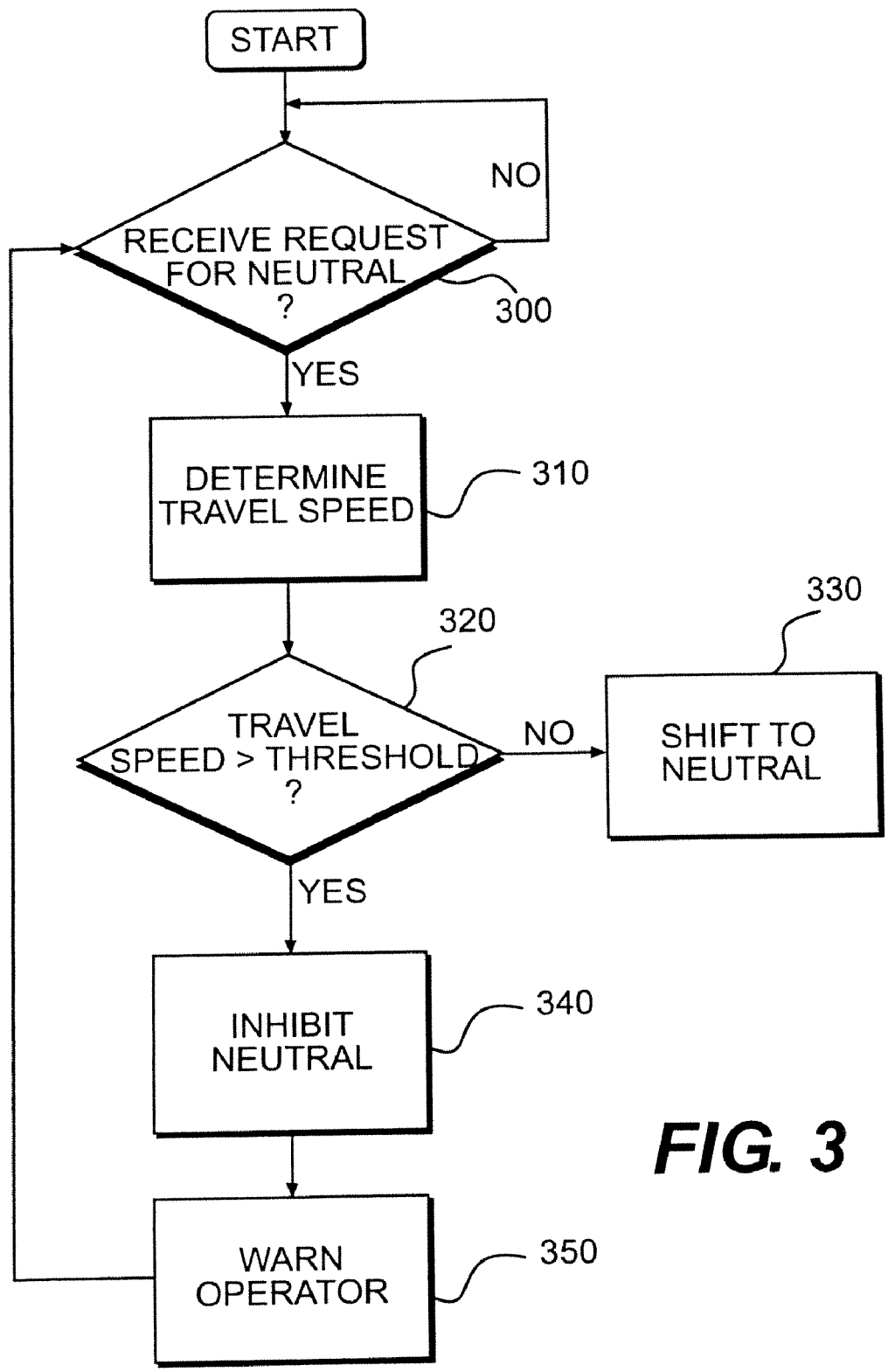
FIGS. 3-5 are flow charts depicting exemplary methods of operating the power train of FIG. 2.
Figure 4:
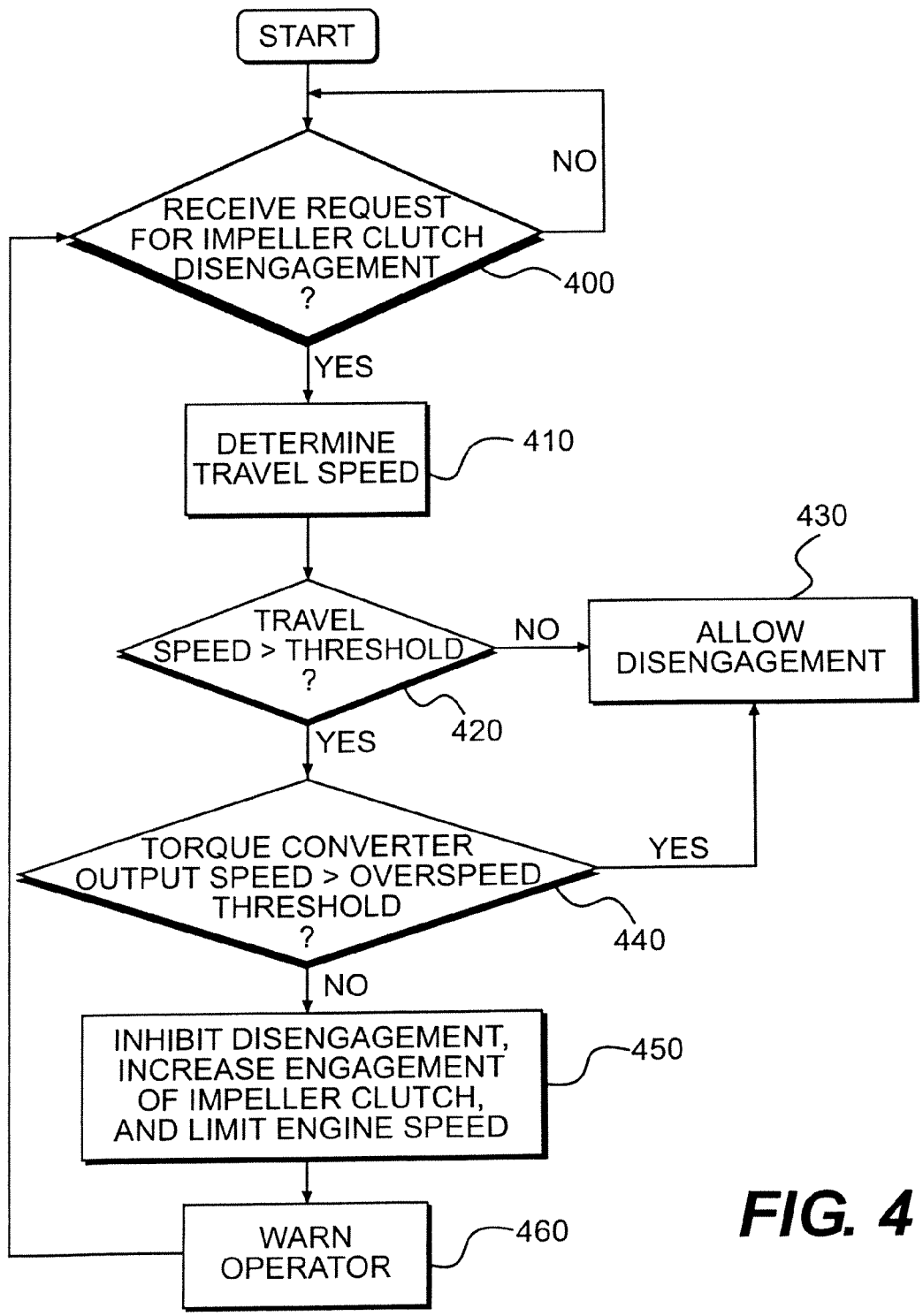
Figure 5:
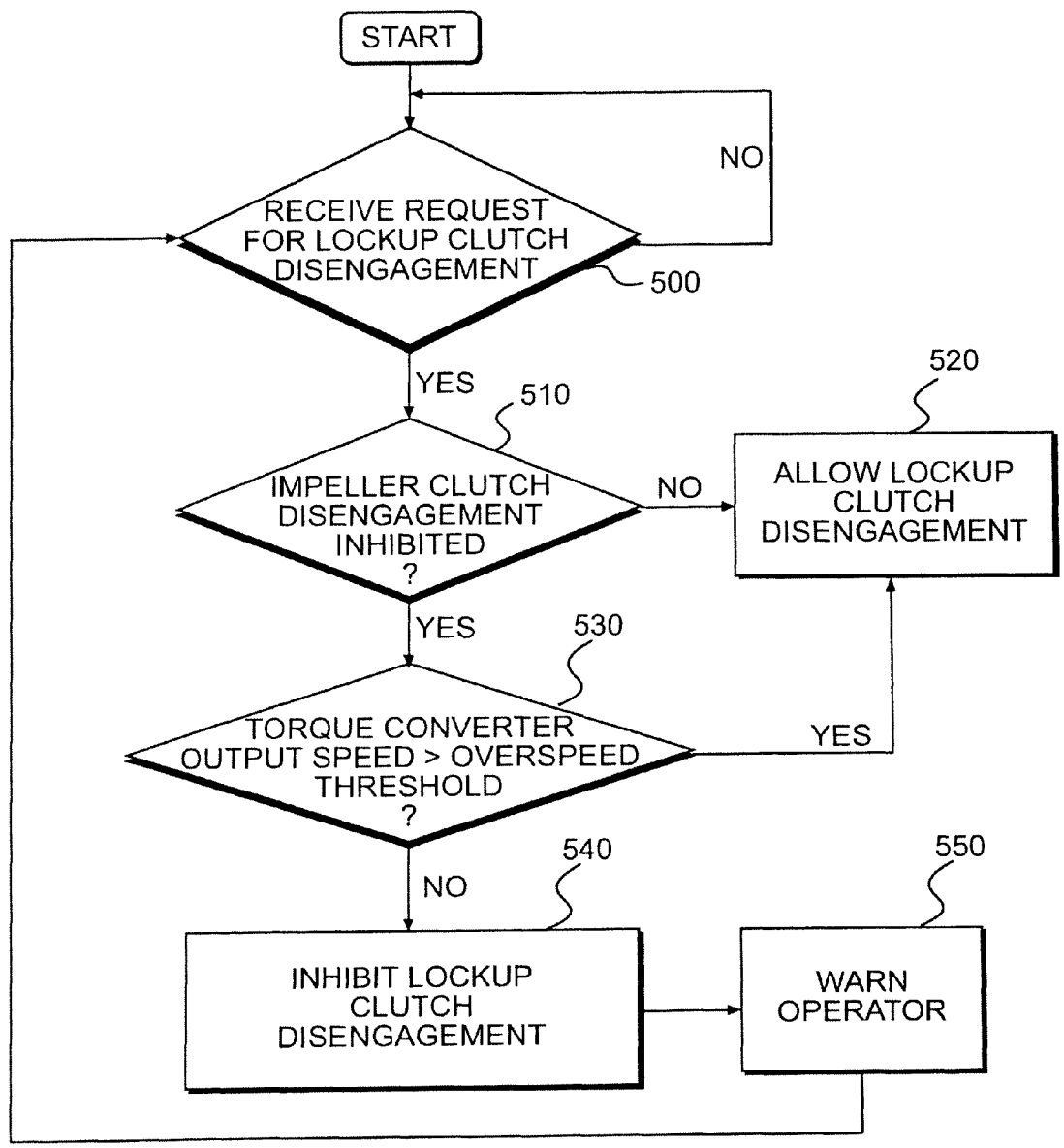

FIGS. 3-5 outline exemplary methods that may be used in order to prevent overspeed from neutral coasting. These figures will be discussed in detail below.

INDUSTRIAL APPLICABILITY

The present disclosure may be applicable to any vehicle where prevention of overspeeding from neutral coasting is desired. The disclosed system may inhibit the disengagement of a vehicle's transmission from a power source via an impeller clutch and/or a lockup clutch when the vehicle exceeds a certain travel speed, so that the speed of the vehicle is constrained by losses of the power source. In combination with the prevention of impeller clutch disengagement and/or prevention of lockup clutch disengagement, the disclosed system may activate an engine retarder to further decelerate the vehicle. The disclosed system may also prevent the vehicle's transmission from shifting to a neutral gear if the vehicle's travel speed is too high. In this manner, the disclosed system may prevent high vehicle speeds that exceed the vehicle's braking capacity, thus avoiding possible vehicle damage. Examples of the disclosed system's operation will now be provided.

In one example, machine 10 may be a wheel loader that is traveling down a grade of five percent. While traveling down the grade, the wheel loader's operator may attempt to select a neutral gear ratio to achieve a faster run-out speed. The neutral gear ratio is a condition in transmission 16 where the force and speed applied to the input shaft of transmission 16 are not transmitted to the output shaft of transmission 16. Upon attempting to select the neutral gear ratio, the method of FIG. 3 may be activated (step 300). Controller 32 may determine the travel speed of the machine 10 by communicating with travel speed sensor 40 (step 310). Controller 32 may compare the measured machine travel speed to an allowed neutral threshold speed (step 320) stored in the memory of controller 32. If the travel speed is below the neutral threshold speed, then the desired switch to the neutral gear ratio may be allowed (330). In the alternative, if the travel speed is above the neutral threshold speed, then the desired change to the neutral gear ratio may be prevented (step 340). By preventing the neutral gear ratio, the travel speed of machine 10 may be constrained by the losses associated with motoring power source 12. However, though the neutral gear ratio may be inhibited, controller 32 may still allow shifting to other non-neutral gear ratios. The inhibition of the neutral gear ratio may be maintained by controller 32 until the conditions for its implementation are no longer satisfied.

Controller 32 may also provide visual feedback to the operator regarding the prevention of the neutral gear change (step 350). This feedback may be provided via indicator device 33. This feedback may be in the form of a blinking light, flashing text or image on a display screen, an audible alert, or any other method known in the art. The visual feedback and neutral gear ratio lockout may remain in effect until the request for the neutral gear ratio is discontinued or until the travel speed of machine 10 is below the neutral threshold speed.

As is illustrated in FIG. 4, control system 28 may also prevent machine overspeed due to a request for a reduction or complete disengagement of impeller clutch 15. While traveling down the grade, controller 32 may receive an operator request to reduce the magnitude of engagement (or entirely disengage) impeller clutch 15 (step 400). Controller 32 may then determine the travel speed of the machine 10 by communicating with travel speed sensor 40 (step 410). Controller 32 may compare the measured travel speed to an allowed impeller threshold travel speed (step 420). If the machine travel speed is below the allowed impeller threshold travel speed, the disengagement of impeller clutch 15 may be allowed (step 430). Specifically, there may be a reduction in the frictional engagement between the input and output disks of impeller clutch 15, resulting in a decrease in coupling between power source 12 and the input of torque converter 14.

In addition to machine overspeed protection, control system 28 may provide a protection for power source 12. Control system 28 may provide that power source 12 does not exceed a maximum power source speed, resulting in potential damage. In the alternative case of FIG. 4, where the travel speed is above the impeller threshold travel speed, controller 32 may then compare the speed of the torque converter output to the power source overspeed threshold (step 440). Controller 32 may determine the speed of the torque converter output by communicating with torque converter output speed sensor 34. If the speed of the torque converter output is greater than the power source overspeed threshold, then the disengagement of the impeller clutch 15 may be allowed (step 430). In the alternative, if the speed of the torque converter output is below the power source overspeed threshold, then the disengagement of impeller clutch 15 may be prevented (step 450). Furthermore, if the disengagement of the impeller clutch 15 is inhibited, controller 32 may also increase the degree of engagement between power source 12 and transmission 16, thus constraining the machine travel speed via the motoring of power source 12. The degree of engagement may be increased by increasing the frictional engagement of impeller clutch 15 (step 450). The degree of impeller clutch engagement may be increased to its maximum level.

To further constrain the travel speed of machine 10, controller 32 may limit the speed of power source 12 (step 450) when the disengagement or reduction in engagement of impeller clutch 15 is inhibited. This speed limitation may be substantially constant, forcing power source 12 to remain below a constant speed, or it may be variable, forcing the power source 12 to decelerate. Controller 32 may impose this power source speed limitation by reducing a throttle set point and/or by activating engine retarder 30. Controller 32 may reduce the speed of power source 12 proportional to the displacement of impeller clutch input device 46a (e.g., increase in input device displacement leads to increase in limitation of power source speed). Controller 32 may also provide visual feedback to the operator regarding the non-allowance of the impeller clutch disengagement and/or the engine retarding (step 450). The prevention of the impeller clutch disengagement and the power source speed limitation may be maintained by controller 32 until the conditions for their implementation are no longer satisfied.

As is illustrated in FIG. 5, control system 28 may also prevent machine overspeed due to disengagement of lockup clutch 22. The control loop may be commenced when controller 32 receives a request to disengage lockup clutch 22 (step 500). Upon receiving this request, controller 32 may then determine if impeller clutch 15 disengagement is currently inhibited (step 510). If the disengagement of impeller clutch 15 is allowed, then lockup clutch 22 may likewise be allowed to disengage (step 520). If the disengagement of the impeller clutch 15 is inhibited, then controller 32 may then compare the speed of the torque converter output to the power source overspeed threshold (step 530). Controller 32 may determine the speed of the torque converter output by communicating with torque converter output speed sensor 34. If the speed of the torque converter output is greater than the power source overspeed threshold, then the disengagement of the lockup clutch 22 may be allowed (step 520). In the alternative, if the speed of the torque converter output is below the power source overspeed threshold, then the disengagement of the lockup clutch 22 may be prevented (step 540). Furthermore, if the disengagement of the lockup clutch 22 is prevented, then controller 32 may provide visual feedback to the operator regarding the non-allowance of the lockup clutch disengagement via indicator device 33 (step 550). The prevention of the lockup clutch disengagement may be maintained by controller 32 until the conditions for its implementation are no longer satisfied.

It will be apparent to those skilled in the art that various modifications and variations can be made to the disclosed vehicle overspeed system without departing from the scope of the invention. Other embodiments of the machine control system will be apparent to those skilled in the art from consideration of the specification and practice of the machine control system disclosed herein. It is intended that the specification and examples be considered as exemplary only, with a true scope being indicated by the following claims and their equivalents

What is claimed is:

1. A method for preventing vehicle overspeeding, comprising:
   transmitting power from a power source of a vehicle to a traction device;
   sensing a speed of the vehicle;
   receiving a request through an operator input device to decrease a degree of coupling between the power source and the traction device; and
   selectively preventing with a controller the decrease in the degree of coupling based on the sensed speed.

2. The method of claim 1, wherein selectively preventing includes overriding an operator's command to reduce the power transmission.

3. The method of claim 1, further including decelerating the power source in response to:
   the sensed speed exceeding a threshold speed; and
   receiving the request to decrease the degree of coupling.

4. The method of claim 3, further comprising alerting an operator after selectively preventing the decrease in the degree of coupling based on the sensed speed.

5. The method of claim 1, wherein selectively preventing includes preventing decoupling when the sensed speed exceeds a threshold speed.

6. The method of claim 1, wherein selectively preventing the decrease in the degree of coupling includes preventing a decrease in a degree of coupling of at least one of a lockup clutch or an impeller clutch located between the power source and the traction device.

7. The method of claim 6, wherein the coupling of the traction device to the power source occurs through at least the impeller clutch, and the method further includes increasing the degree of coupling when an input to the impeller clutch exceeds a threshold amount.

8. The method of claim 1, further including preventing shifting of a transmission unit associated with the power source to a neutral condition based on the request to decrease the degree of coupling.

9. A method for preventing vehicle overspeeding, comprising:
- transmitting power from a power source of a vehicle to a traction device coupled to the power source;
- sensing a speed of the vehicle;
- receiving a request to decrease a degree of coupling between the power source and the traction device;
- preventing a shift of a transmission associated with the power source to a neutral condition if the vehicle exceeds a first threshold speed; and
- preventing with a controller the decrease in the degree of coupling if the speed of the vehicle exceeds a second threshold speed greater than the first threshold speed.

10. The method of claim 9, wherein preventing the decrease in the degree of coupling includes overriding an operator's command to reduce the power transmission.

11. The method of claim 9, further including decelerating the power source in response to:
- the sensed speed exceeding a third threshold speed; and
- receiving the request to decrease the degree of coupling.

12. The method of claim 9, wherein the coupling of the traction device to the power source occurs through at least one of an impeller clutch or a lockup clutch.

13. The method of claim 12, wherein the coupling of the traction device to the power source occurs through at least the impeller clutch, and the method further includes increasing the degree of coupling when an input to the impeller clutch exceeds a threshold amount.

14. The method of claim 9, further comprising alerting an operator after preventing the decrease in coupling based on the sensed speed.

15. A method for preventing vehicle overspeeding, comprising:
- transmitting power from a power source of a vehicle to a traction device coupled to the power source via at least one of an impeller clutch or a lockup clutch;
- sensing a speed of the vehicle;
- receiving a request through an operator input device to decrease a degree of coupling of the power source to the traction device; and
- preventing with a controller the decrease in the degree of coupling via the at least one of the impeller clutch or the lockup clutch based on the sensed speed.

16. The method of claim 15, wherein preventing the decrease in the degree of coupling includes preventing a decrease in a degree of coupling of both the lockup clutch and the impeller clutch.

17. The method of claim 15, further including preventing a shift of a transmission associated with the power source to a neutral condition if the vehicle exceeds a threshold speed.

18. The method of claim 15, further including allowing a decrease in the degree of coupling of the at least one of the impeller clutch or the lockup clutch if the speed of the vehicle is below a threshold speed.

19. The method of claim 18, further including increasing the degree of coupling when an input to the impeller clutch exceeds a threshold amount.

20. The method of claim 15, further comprising alerting an operator after preventing the decrease in coupling based on the sensed speed.

21. The method of claim 15, wherein preventing the decrease in the degree of coupling includes preventing a decrease in a degree of coupling of the lockup clutch.

22. The method of claim 15, wherein preventing the decrease in the degree of coupling includes preventing a decrease in a degree of coupling of the impeller clutch.

* * * * *